May 16, 1961  K. L. JOHNSTON  2,984,358
SEPARATION OF CATALYST FINES
Filed Jan. 3, 1957

INVENTOR.
K.L. JOHNSTON
BY Hudson & Young
ATTORNEYS

United States Patent Office 2,984,358
Patented May 16, 1961

2,984,358

SEPARATION OF CATALYST FINES

Kenneth L. Johnston, Bartlesville, Okla., assignor to Phillips Petroleum Company, a corporation of Delaware Filed Jan. 3, 1957, Ser. No. 632,361

4 Claims. (Cl. 209—483)

This invention relates to separation of a mixture of particulate material according to particle size. In one aspect it relates to a process for separation of particles of small size, that is fines, from coarser material. In another aspect it relates to a process for separating catalyst fines from coarse catalyst particles in moving bed conversion systems employing conversion catalysts of 4 to 10 mesh in size.

In catalytic conversion systems wherein moving bed catalysts are used containing catalyst particles of approximately 4 to 10 mesh (U.S. standard sieve scale) in size, a certain amount of catalyst attrition occurs thus producing undesired fines. In conversion systems which employ approximately 4 to 10 mesh catalyst grains, the presence of material finer than 10 mesh tends to interfere with the general operation of the process. The presence of too great a proportion of catalyst fines in such a system as the Thermofor Catalytic Cracking (TCC), results in poor vapor distribution in the catalytic conversion vessel and in poor air distribution in the regeneration vessel. Poor catalyst flow from vessel to vessel also lends to the production of catalyst fines. Increased attrition and still further production of catalyst fines also result in the production of still more fines.

One prior art method of removing fines from such a catalyst as that mentioned hereinbefore is to employ an elutriator on a small fraction of the main stream of catalyst flowing in the system. The stream of catalyst taken for the elutriation treatment is usually taken from the catalyst separator surge vessel. From this vessel the stream of catalyst for removal of fines is passed directly from the catalyst separator surge to the elutriation vessel. Catalyst free or relatively free from fines is then passed from the bottom of the elutriation vessel to the catalyst lift pot from which the catalyst is returned to the catalyst separator surge for reuse in the system.

In the elutriator the catalyst is showered downwardly through a vessel and countercurrently to an upward flow of flue gases taken from the top of the regenerator vessel or kiln, as it is sometimes called. The flue gas velocity is maintained sufficient to carry the catalyst fines upwardly in suspension, thereby effecting a separation of the fines from the coarse particles. The rate of flow of the flue gases is adjusted to control the size of catalyst particles separated. Such an elutriation separator tends to produce additional catalyst fines. Thus, the use of conventional elutriation is to be avoided if possible.

Furthermore, in case the catalyst in use in the system contains fines more dense than the coarser particles, these more dense particles are not effectively removed in the elutriation system and tend to remain with the coarser large particles for recirculation in the catalyst system. It is realized that in an elutriation system which, for example, treats particles of non-uniform density, the more dense particles will tend to remain in the system while the upward flowing gases carry only the lower density particles from the system. In catalyst systems more dense particles frequently result from over-heating and reduction of porosity of catalyst grains. Catalyst grains of reduced porosity are, as is well known, less active catalytically than particles of greater porosity. Thus, such an elutriation system tends to permit retention of the less active heavy catalyst grains in the system in contrast to the present process, as hereinafter described.

In my process the more dense fine particles of catalyst are more easily removed than the less dense and more porous fine size particles, thus permitting more efficient removal of the less desired and less efficient catalyst.

An object of my invention is to provide a method for separation of catalyst fines from normally coarse grain catalyst.

Another object of my invention is to provide a process for separating catalyst fines of greater density and less activity than the main body of catalyst of relatively large particle size.

Yet another object of my invention is to provide a process for separating catalyst fines of the same density as that of the coarser material of the main body of catalyst.

Still another object of my invention is to provide such a process and an apparatus in which to practice this process, which is relatively inexpensive to construct and to maintain.

Still another object of my invention is to provide a catalyst fines separation system which in itself does not produce an appreciable amount of catalyst fines.

Still other objects and advantages will be realized upon reading the following description which, taken with the attached drawing, forms a part of this specification.

This invention relates in particular to an apparatus for separating fines from granular material containing said fines comprising, in combination, a conduit for passage of said granular material, said conduit having an inlet and an outlet for said material, said conduit being so disposed that its axis forms an angle with the horizontal less than 90° but greater than the angle of repose of said material with respect to said conduit, said inlet being disposed at a higher elevation than said outlet and an opening in the lower side of said conduit intermediate said outlet and inlet.

Furthermore, this invention relates to a method for removing catalyst fines from a catalyst feed containing granular material and fines comprising, passing said catalyst containing granular material and fines downward through a zone sloping at an angle downward from the horizontal greater than the angle of repose of said catalyst with respect to said zone but less than 90°, withdrawing granular material containing a higher concentration of said fines than the concentration of fines in said catalyst feed from an opening in the lower wall of said sloping zone, withdrawing the remaining catalyst containing a lower concentration of fines than said catalyst feed from the lower end portion of said zone as the main product of the operation.

Figure 1:
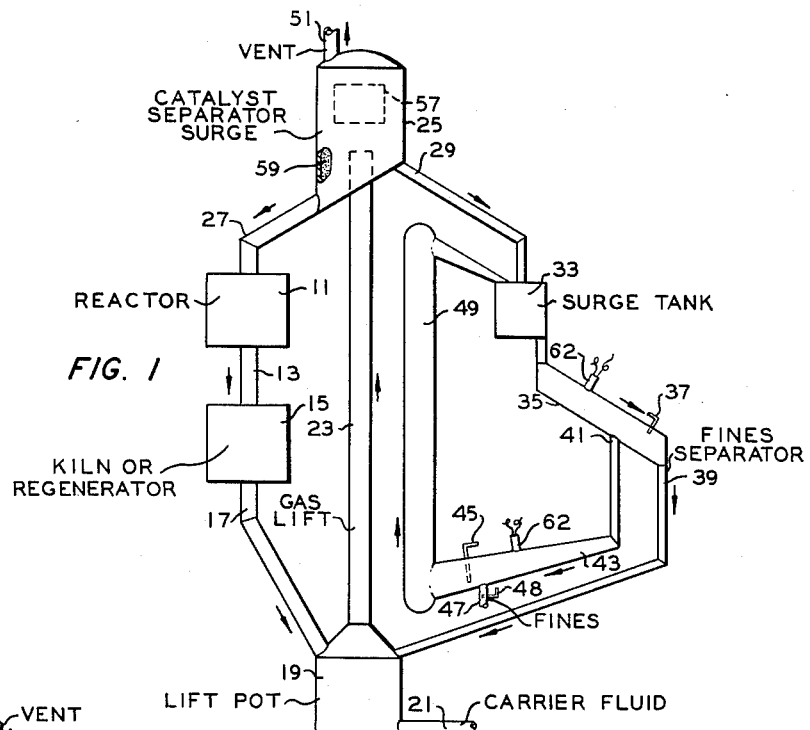
Figure 1 illustrates one embodiment of my invention in conjunction with a conventional moving bed catalyst conversion system.

Referring now to the drawing and particularly to Figure 1, reference numeral 11 identifies a reaction vessel or reactor of a moving bed catalytic conversion system. A pipe 13 conducts catalyst from reactor 11 to a kiln or regenerator vessel 15. The regenerator vessel is provided with conduits for inlet of a free-oxygen containing gas, such as air, for regeneration of the catalyst, and for exit of the combustion gases. These conduits or pipes are not shown in the drawing since their use and installation are well understood by those skilled in the art. Regenerated catalyst passes from regenerator 15 through a pipe 17 into a lift pot 19. A carrier fluid such as hot regenerator gas enters lift pot 19 through a pipe 21 for lifting regenerated catalyst up through a pipe 23 to a catalyst separator surge tank 25. Catalyst in this tank is identified by reference numeral 59. Catalyst from this tank passes through a pipe 27 into the reactor vessel 11 for reuse in the system. The carrier fluid entering lift pot 19 from pipe 21 is hot, for example, in some cases it is the off-gas from the regenerator vessel 15, so that the catalyst will be maintained in a properly heated condition prior to reuse in the reactor 11. Insulation is provided for restricting heat loss.

An inverted cylinder 57 is provided in the catalyst separator surge tank 25 to assist in separation of the lift gas from the catalyst so that solid catalyst particles will not issue from tank 25 through a vent pipe 51 and be lost from the system.

A portion of the catalyst bed 59 in tank 25 flows through a conduit 29 into a surge vessel 33 from which the catalyst flows into a conduit 35 for treatment according to my invention. Conduit 35 is installed in the system at such an angle from the horizontal that the catalyst material entering this conduit easily flows by gravity to its lower end. That is, the pipe is so installed that the angle of its axis from the horizontal is at least slightly greater than the angle of repose of the catalyst with respect to the walls of this conduit so that the catalyst flows from top to bottom therethrough at all times. On passing through pipe 35 the fine material tends to settle to the bottom while the coarser material remains reasonably well distributed throughout the cross section of this conduit. A pipe 41 is attached to the lower side of conduit 35 at about the position indicated in the drawing. The lower end of pipe 41 is attached to the upper end of another conduit 43 which is similar to conduit 35 excepting it is smaller in cross section. Conduit 43 is disposed at the same angle from the horizontal as conduit 35 and for the same reasons. A slide valve 37 is provided in conduit 35 and a slide valve 45 is provided in conduit 43 at about the positions indicated in the drawing. These slide valves provide for regulation of the rates of flow of catalyst through the respective conduits. According to my invention conduit 35 is maintained full or substantially full of catalyst at all times so that there will not be tendency for mixing of the catalyst particles during their passage therethrough. Similarly, conduit 43 is maintained full or substantially full of catalyst to eliminate any chance of mixing of different size particles. Since pipe 41 is attached to conduit 35 along the bottom of the latter, fine material which tends to settle in the body of catalyst on its passage through conduit 35 is removed along with some of the coarse grains of catalyst through pipe 41. This removed material contains a higher concentration of catalyst fines than the catalyst material fed into the upper end of conduit 35.

On passing through conduit 43 the catalyst fines again tend to settle to the bottom of the body of catalyst in this conduit in the same manner mentioned above relative to conduit 35, and this fine material along with some coarse grains of catalyst is removed from conduit 43 through a pipe 47 for such disposal as desired. A slide valve 48 is disposed in pipe 47 to regulate the rate of withdrawal of material withdrawn from conduit 43 through pipe 47.

Treated catalyst, that is, catalyst treated for removal of fines is removed from the lower end of conduit 35 and is passed through a pipe 39 to be added to the main body of catalyst in the lift pot 19. The catalyst passing the slide valve 45 near the bottom end of conduit 43 frequently contains a sufficient proportion of catalyst fines as to warrant retreatment, and accordingly I provide a bucket elevator 49 for returning this catalyst from the bottom end of conduit 43 to surge tank 33 as recycle catalyst. By such recycling the overall separation of the fine catalyst material is improved.

While settling of catalyst fines in conduits 35 and 43 is relatively efficient, I find that settling efficiency is improved if vibrators 62 are installed relative to conduits 35 and 43 as indicated. These vibrators are, if desired, electric vibrators and are so arranged that they continuously vibrate conduits 35 and 43, which vibration increases the degree of settling of the fines. While the use of such vibrators improves the degree of settling, their use is not essential because by providing conduits 35 and 43 of substantial lengths the settling and separation of catalyst fines is sufficiently efficient for their proper removal from such a catalyst system as the aforementioned TCC system.

Figure 2:
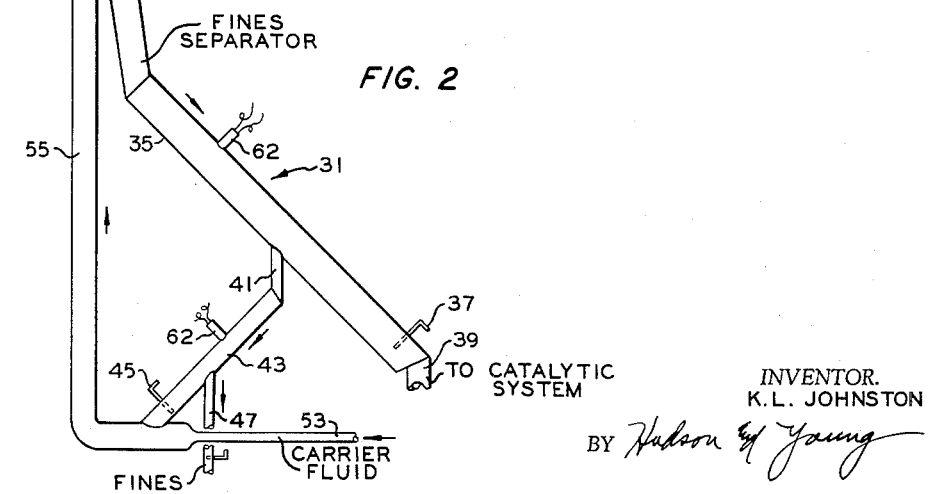
Figure 2 illustrates an alternate form of a portion of the apparatus of Figure 1.

While I have illustrated in Figure 1 the use of a bucket elevator 49 for elevating recycle catalyst from the bottom end of conduit 43 to surge tank 33, I can, when desired, employ a carrier fluid for transporting this catalyst. Figure 2 illustrates that portion of a catalyst fines separation system involving use of a carrier fluid for effecting this transfer of catalyst. A pipe 55 is connected with the bottom end of conduit 43, as illustrated, with pipe 55 leading into vessel 63 so as to discharge lifted catalyst into an inverted cylinder 61. A carrier fluid such as regenerator combustion gases from regenerator 15 is passed into pipe 55 through a pipe 53 at such a velocity as to effect transfer of the catalyst at the rate desired. Tank 63 is provided with a vent 64 for exit of carrier fluid from tank 63. The inverted cylinder 61 serves the same purpose in tank 63 as inverted cylinder 57 serves in surge tank 25, that is, to assist in effecting separation of lifted catalyst from the gas so that on venting of the gas catalyst will not be entrained therein.

As an example of the operation of my catalyst fines removal system employing such apparatus as illustrated in the drawing, are the following operational data.

The catalyst treated was a TCC silica-alumina type catalyst ordinarily used in such a moving bed conversion operation. The useable range of catalyst particle size is from 4 to 10 mesh (U.S. standard sieve scale). Broken catalyst smaller than 10 mesh is considered undesirable in such an operation. In the example, 15 tons per hour, that is 360 tons per day, of catalyst is passed through conduit 35 with 51 tons per day being withdrawn through pipe 41 for passage through conduit 43. The conversion system circulates about 235 tons catalyst per hour, thus making a total catalyst circulation of 250 tons per hour, of which the 45 tons per hour passed through the system of my invention comprises 6 percent. One ton per day of catalyst is withdrawn from pipe 43 through pipe 47 as final reject material. Fifty tons per day are elevated either by bucket elevator 49 or by gas lift 55 for recycling through these separation steps. The 50 tons of recycle catalyst are accordingly added to the above-mentioned 360 tons per day, making a total of 410 tons per day catalyst actually passing through conduit 35. From this amount of daily throughput 359 tons per day of catalyst of reduced concentration of fines are passed from conduit 35 through pipe 39 for addition to the main stream of catalyst being passed through lift pot 19.

The sieve analyses of the feed (29), the finished product (39), and the reject material (47) are as follows:

TABLE I

*Sieve analysis, U.S. standard sieves, wt. percent*

| Product, Ref. No. | Pipe 29 | Pipe 39 | Pipe 47 |
|---|---|---|---|
| Tons per day | 360 | 359 | 1 |
| On 4 mesh sieve | 1.69 | 1.69 | |
| 4 to 5 mesh | 55.00 | 55.16 | |
| 5 to 6 mesh | 18.03 | 18.08 | |
| 6 to 7 mesh | 8.69 | 8.71 | |
| 7 to 8 mesh | 6.81 | 6.82 | 3.60 |
| 8 to 10 mesh | 5.39 | 5.36 | 16.40 |
| Thru 10 mesh | 4.39 | 4.18 | 80.00 |

The following data are for comparative purposes and show the results of a treating system similar to that of the present invention but without recycle, that is, without return of material from the lower end of conduit 43 via elevator 49 or air lift 55 for retreatment.

TABLE 2

*Screen analysis of treated material, without recycle U.S. standard sieves, weight percent*

| Product, Ref. No. | Pipe 29 | 39+49 or 39+55 | Pipe 47 |
|---|---|---|---|
| Tons per day | 360 | 358.75 | 1.25 |
| On 4 mesh sieve | 1.69 | 1.69 | |
| 4 to 5 mesh | 55.00 | 55.19 | |
| 5 to 6 mesh | 18.03 | 18.09 | |
| 6 to 7 mesh | 8.69 | 8.72 | |
| 7 to 8 mesh | 6.81 | 6.82 | 8.88 |
| 8 to 10 mesh | 5.39 | 5.31 | 27.12 |
| Thru 10 mesh | 4.39 | 4.18 | 64.00 |

For comparison purposes the following table gives data showing results when using a prior art elutriation process for separating fine catalyst from the catalyst such as that passing through pipe 29:

TABLE 3

| Product | Feed (pipe 29), 200 tons/day | Recovered product, 199 tons/day | Fines, 1 ton/day |
|---|---|---|---|
| | Weight percent | Weight percent | Weight percent |
| On 4 mesh | 1.59 | 1.70 | |
| 4 to 5 mesh | 55.00 | 55.28 | |
| 5 to 6 mesh | 18.03 | 18.12 | |
| 6 to 7 mesh | 8.69 | 8.73 | |
| 7 to 8 mesh | 6.81 | 6.83 | 4.10 |
| 8 to 10 mesh | 5.39 | 5.31 | 20.80 |
| Thru 10 mesh | 4.39 | 4.03 | 75.10 |

Summing up separation efficiencies of (1) the process of the invention, (2) process without recycle, and (3) prior art elutriation, are the following:

(1) 1 ton of reject contains 0.8 ton of thru 10 mesh fines;
(2) 1 ton of reject contains 0.64 ton of thru 10 mesh fines;
(3) 1 ton of reject contains 0.751 ton of thru 10 mesh fines.

From another angle, the comparative efficiency of the present process is pointed out as follows:

(1) To discard 0.8 ton of thru 10 mesh fines requires reject of 1 ton material through pipe 47;
(2) To discard 0.8 ton of thru 10 mesh fines requires reject of 1.25 ton of material (without recycle);
(3) To discard 0.8 ton of thru 10 mesh fines requires reject of 1.07 ton of material (elutriation).

From the above data it is noted that the use of my catalyst removal system removes a sufficient amount of the fines with the loss of the least amount of catalyst of useful size than when a recycle is not used (Table 2) or when using a conventional elutriation system (Table 3).

While in one embodiment I employ a gas lift for transferring the recycle catalyst (Figure 2), the amount of catalyst recycle is relatively small and the amount of fines produced in this gas-lift operation is within tolerable limits.

Although I have described my process and apparatus with respect to a catalytic cracking operation, it is obvious that my system can be used to separate other granular solids according to particle size, irrespective of their densities. Although I have disclosed use of two separation units, that is, conduits 35 and 43, it will be realized that under some conditions only one such conduit may be sufficient to remove a given proportion of fine material, while under other conditions more than two such units may be necessary. In some cases the use of a relatively long separation unit may be more desirable than the use of two or more relatively short units.

While I have mentioned hereinbefore that the angle of slope of conduits 35 and 43 is greater than the angle of repose of the solid catalyst material being treated with respect to the conduits, the angle can usually be between about 30 degrees and 50 degrees, preferably about 45 degrees (from the horizontal). While the specific degree of slope is not critical, it is realized that conduits 35 and 43 should not approach the vertical and should be as nearly horizontal as can be and yet make certain that material being treated will continuously flow therethrough. When positioned at an angle several degrees greater than the angle of repose, it is realized that the rate of flow may not be as great as required under all conditions, and for that reason it is preferable to position the conduits at an angle about 8 or 10 degrees more sloping than the angle of repose. When employing gas lift as in Figure 2 for lifting the recycle catalyst, it is necessary that the body of catalyst in conduit 43 be substantial to prevent backflow of the carrier gas. Similarly, when using a gas lift as illustrated in Figure 1, a sufficient body of catalyst in conduit 35 must be maintained in order to prevent backflow of carrier fluid from the lift pot 19. However, by proper operation of the slide valves sufficient catalyst is always maintained in the system to prevent any possible backflow of carrier gas.

The aforementioned 6 percent catalyst passed through my fines separation system is not critical as to ratio to the catalyst in the conversion system. If it is desired to separate more fines, more than 6 percent of the system's catalyst is treated for fines removal. That is, the ratio of catalyst passed through my fines removal system is varied to suit any given set of operating conditions. The invention is also applicable to treating catalysts having other screen analyses than that given in Table 1, that is, it is used for removing fines from coarser or from finer catalysts than that illustrated herein.

By removing 0.8 ton of thru 10 mesh catalyst fines from 6 percent of a catalyst stream I find that the fines circulated with catalyst grains of preferred size is maintained at a suitably low concentration.

The relative amount of catalyst withdrawn via pipe 41 is regulated by the diameter of pipe 41 and by the size of the opening in conduit 35 to which pipe 41 is attached by the adjustment of slide valve 37, and by the adjustments of slide valves 45 and 48. While these valves are disclosed as being slide valves, other types of valves can be employed, such as star valves, if desired.

While certain embodiments of the invention have been described for illustrative purposes, the invention obviously is not limited thereto.

I claim:

1. A catalyst conversion system employing a moving bed of granular catalyst material wherein catalyst fines are produced, comprising, in combination, a reactor vessel, a regenerator vessel, a first means for passage of catalyst from the reactor vessel to the regenerator vessel, second means for elevating catalyst from the lower portion of the regenerator vessel to the upper portion of said reactor vessel, a first conduit for passage of a portion of said material containing fines, said first conduit having an inlet and outlet and being so disposed that its axis forms an angle with the horizontal less than 90° but greater than the angle of repose of said material with respect to said first conduit, said inlet being disposed at a higher elevation than said outlet and being connected with an upper portion of said second means, a first opening in the lower side of said first conduit intermediate said outlet and inlet for outlet of material passed thereinto, said first opening being nearer the outlet than the inlet, a first valve in said first conduit, intermediate said first opening and said outlet for maintaining said first conduit intermediate its inlet and said first valve full of said granular material, a second conduit, said second conduit having an inlet and an outlet for flow of granular material containing fines, said second conduit also being so disposed that its axis forms an angle with the horizontal less than 90° but greater than the angle of repose of material contained therein, said inlet of said second conduit being disposed at a higher elevation than the outlet thereof and in communication with said first conduit by way of said first opening, a second opening in the lower side of said second conduit intermediate its inlet and outlet for outlet of material passed thereinto, said second opening being nearer the outlet than the inlet of said second conduit, a second valve in said second conduit intermediate said second opening and the outlet of said second conduit for maintaining said second conduit for maintaining said second conduit intermediate its inlet and said second valve full of said granular material, third means for regulating the rate of flow of material through said second opening, a third conduit connecting the outlet of said first conduit with said second means for passage of granular material to said second means, and a fourth conduit connecting the outlet of said second conduit to the inlet of said first conduit for return of material to said first conduit.

2. In the system of claim 1, first and second vibrators communicating with said first and second conduits, respectively, to vibrate said first and second conduits thereby to increase the degree of settling of fines in said first and second conduits.

3. A catalytic conversion system employing a moving bed of granular catalyst material wherein catalyst fines are produced comprising, in combination, a first conduit for passage of a portion of said material containing fines, said conduit having an inlet and an outlet, said first conduit being so disposed that its axis forms an angle with the horizontal less than 90° but greater than the angle of repose of said material with respect to said first conduit, a gas lift elevator, said inlet being disposed at a higher elevation than said outlet and being in communication with an upper portion of said elevator, an opening in the lower side of said first conduit intermediate said outlet and inlet for outlet of material passed thereinto, said opening being nearer the outlet than the inlet, a second conduit leading from said opening, a first valve in said first conduit for regulating the rate of flow of said material therein, said first valve being disposed on the side of said opening adjacent said outlet, a second valve in said second conduit for regulating the flow of granular material and fines through said opening, and a third conduit communicating the outlet of said first conduit with a lower portion of said elevator for return of catalyst to said elevator.

4. A catalytic conversion system employing a moving bed of granular catalyst material wherein catalyst fines are produced comprising, in combination, a first conduit for passage of a portion of said material containing fines, said conduit having an inlet and an outlet, said first conduit being so disposed that its axis forms an angle with the horizontal less than 90° but greater than the angle of repose of said material with respect to said first conduit, a bucket elevator, said inlet being disposed at a higher elevation than said outlet and being in communication with an upper portion of said elevator, an opening in the lower side of said first conduit intermediate said outlet and inlet for outlet of material passed thereinto, said opening being nearer the outlet than the inlet, a second conduit leading from said opening, a first valve in said first conduit for regulating the rate of flow of said material therein, said first valve being disposed on the side of said opening adjacent said outlet, a second valve in said second conduit for regulating the flow of granular material and fines through said opening, and a third conduit communicating the outlet of said first conduit with a lower portion of said elevator for return of catalyst to said elevator.

References Cited in the file of this patent
UNITED STATES PATENTS

| Re. 21,682 | Stump | Dec. 31, 1940 |
| 2,434,843 | Fahnestock | Jan. 20, 1948 |
| 2,567,207 | Hoge | Sept. 11, 1951 |
| 2,742,343 | McClure | Apr. 17, 1956 |
| 2,772,223 | Bergstrom | Nov. 27, 1956 |

OTHER REFERENCES

Jeffrey-Traylor Catalog 650, December 22, 1938, pp. 44–45.

UNITED STATES PATENT OFFICE
CERTIFICATE OF CORRECTION

May 16, 1961

Patent No. 2,984,358

Kenneth L. Johnston

It is hereby certified that error appears in the above numbered patent requiring correction and that the said Letters Patent should read as corrected below.

Column 6, line 55, for "catalyst" read -- catalytic --; column 7, line 16, strike out "for maintaining said second conduit".

Signed and sealed this 13th day of February 1962.

(SEAL)
Attest:

ERNEST W. SWIDER
Attesting Officer

DAVID L. LADD
Commissioner of Patents